(12) United States Patent
Ryu et al.

(10) Patent No.: US 10,547,418 B2
(45) Date of Patent: Jan. 28, 2020

(54) COORDINATED OPERATIONS OF MILLIMETER WAVELENGTH WIRELESS ACCESS NETWORKS

(71) Applicant: QUALCOMM Incorporated, San Diego, CA (US)

(72) Inventors: Jung Ho Ryu, Somerville, NJ (US); Sundar Subramanian, Bridgewater, NJ (US); Junyi Li, Chester, NJ (US); Ashwin Sampath, Skillman, NJ (US); Karl Georg Hampel, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 14/301,312

(22) Filed: Jun. 10, 2014

(65) Prior Publication Data

US 2015/0358129 A1 Dec. 10, 2015

(51) Int. Cl.
*H04L 5/00* (2006.01)
*H04W 72/04* (2009.01)
(Continued)

(52) U.S. Cl.
CPC ....... *H04L 5/0023* (2013.01); *H04W 36/0072* (2013.01); *H04W 72/046* (2013.01);
(Continued)

(58) Field of Classification Search
CPC ........ H04B 7/06; H04B 7/024; H04B 7/0408; H04B 7/0617; H04B 36/0072;
(Continued)

(56) References Cited

U.S. PATENT DOCUMENTS 5,966,670 A * 10/1999 Keskitalo ............... H04B 1/76
455/562.1
6,782,277 B1 * 8/2004 Chen ...................... H01Q 1/246
342/359
(Continued)

FOREIGN PATENT DOCUMENTS

CN 1157067 A 8/1997
CN 101765116 A 6/2010
(Continued)

OTHER PUBLICATIONS

International Search Report and Written Opinion—PCT/US2015/030197—ISA/EPO—dated Aug. 7, 2015.

*Primary Examiner* — Matthew C Sams
(74) *Attorney, Agent, or Firm* — Arent Fox LLP

(57) ABSTRACT

In a first configuration, the apparatus may be a base station. The base station adjusts a periodicity for performing a beam sweep, sends information indicating the adjusted periodicity for performing a beam sweep, and performs the beam sweep at the adjusted periodicity. In a second configuration, the apparatus may be a UE. The UE receives information indicating a periodicity for performing a beam sweep from a base station, adjusts the periodicity for performing the beam sweep, and performs the beam sweep at the adjusted periodicity. For both configurations, the beam sweep is a plurality of transmissions of a beam in a plurality of different transmit spatial directions by one of the base station or the UE and a plurality of scans of the beam transmissions in a plurality of different scan spatial directions by an other of the one of the base station or the UE.

27 Claims, 10 Drawing Sheets

(51) Int. Cl.
    *H04W 36/00*      (2009.01)
    *H04W 72/08*      (2009.01)
    *H04W 88/08*      (2009.01)
(52) U.S. Cl.
    CPC ..... *H04W 72/0446* (2013.01); *H04W 72/085* (2013.01); *H04W 88/08* (2013.01)
(58) Field of Classification Search
    CPC .... H04B 72/046; H04B 72/085; H04B 88/08; H04W 72/082; H04W 16/28; H04W 16/32; H04W 24/10; H04W 52/244; H04L 5/0023
    USPC .............................. 455/63.4, 67.1, 69, 562.1
    See application file for complete search history.

(56) References Cited

U.S. PATENT DOCUMENTS

| | | | | |
|---|---|---|---|---|
| 7,146,164 | B2* | 12/2006 | Hunzinger | H01Q 3/2611 370/334 |
| 8,200,286 | B2* | 6/2012 | Molnar | H01Q 1/246 455/562.1 |
| 2004/0157611 | A1 | 8/2004 | Smith et al. | |
| 2010/0159930 | A1* | 6/2010 | Hagerman | H01Q 3/04 455/436 |
| 2011/0038308 | A1* | 2/2011 | Song | H04B 7/0408 370/328 |
| 2012/0113839 | A1* | 5/2012 | Etemad | H04B 7/024 370/252 |
| 2013/0065622 | A1* | 3/2013 | Hwang | H04W 16/28 455/500 |
| 2013/0156009 | A1 | 6/2013 | Dinan | |
| 2013/0182683 | A1 | 7/2013 | Seol et al. | |
| 2013/0201938 | A1 | 8/2013 | Seol et al. | |
| 2013/0237218 | A1* | 9/2013 | Li | H04W 48/16 455/434 |
| 2013/0258885 | A1 | 10/2013 | Yu et al. | |
| 2013/0336270 | A1* | 12/2013 | Nagata | H04W 16/28 370/329 |
| 2013/0343303 | A1 | 12/2013 | Kim et al. | |
| 2014/0004869 | A1 | 1/2014 | Jung | |
| 2014/0050089 | A1* | 2/2014 | Zhang | H04W 28/08 370/232 |
| 2015/0004918 | A1* | 1/2015 | Wang | H04W 88/02 455/73 |
| 2016/0323075 | A1* | 11/2016 | Jeong | H04L 5/0023 |

FOREIGN PATENT DOCUMENTS

| | | |
|---|---|---|
| CN | 101884174 A | 11/2010 |
| CN | 102204114 A | 9/2011 |
| JP | H11178051 A | 7/1999 |
| JP | 2012510219 A | 4/2012 |
| JP | 2015500602 A | 1/2015 |
| WO | 9637969 A1 | 11/1996 |
| WO | 2009137092 A1 | 11/2009 |
| WO | 2013086164 A1 | 6/2013 |

* cited by examiner

COORDINATED OPERATIONS OF MILLIMETER WAVELENGTH WIRELESS ACCESS NETWORKS

BACKGROUND

Field

The present disclosure relates generally to communication systems, and more particularly, to coordinated operations of millimeter wavelength wireless access networks.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology, which operates at or near a 2 GHz carrier frequency. Preferably, these improvements should be applicable to other multi-access technologies and the telecommunication standards that employ these technologies.

One way to meet the increasing demand for mobile broadband would be to utilize the millimeter wavelength spectrum in addition to LTE. However, communications using the millimeter wavelength radio frequency band has extremely high path loss and a short range. Beamforming may be used to compensate for the extreme high path loss and short range. Beamforming techniques and methods are currently needed for providing seamless and continuous coverage for a UE operating in the millimeter wavelength radio frequency band.

SUMMARY

In an aspect of the disclosure, a method, a computer program product, and an apparatus are provided. The apparatus may be a base station. The base station adjusts a periodicity for performing a beam sweep. The beam sweep is a plurality of transmissions of a beam in a plurality of different transmit spatial directions by one of the base station or a user equipment (UE) and a plurality of scans of the beam transmissions in a plurality of different scan spatial directions by an other of the one of the base station or the UE. In addition, the base station sends information indicating the adjusted periodicity for performing a beam sweep. Further, the base station performs the beam sweep at the adjusted periodicity.

In an aspect of the disclosure, the base station includes means for adjusting a periodicity for performing a beam sweep. The beam sweep is a plurality of transmissions of a beam in a plurality of different transmit spatial directions by one of the base station or a UE and a plurality of scans of the beam transmissions in a plurality of different scan spatial directions by an other of the one of the base station or the UE. The base station further includes means for sending information indicating the adjusted periodicity for performing a beam sweep. The base station further includes means for performing the beam sweep at the adjusted periodicity.

In an aspect of the disclosure, the base station includes a memory and at least one processor coupled to the memory. The at least one processor is configured to adjust a periodicity for performing a beam sweep. The beam sweep is a plurality of transmissions of a beam in a plurality of different transmit spatial directions by one of the base station or a UE and a plurality of scans of the beam transmissions in a plurality of different scan spatial directions by an other of the one of the base station or the UE. The at least one processor is further configured to send information indicating the adjusted periodicity for performing a beam sweep. The at least one processor is further configured to perform the beam sweep at the adjusted periodicity.

In an aspect of the disclosure, a computer program product stored on a computer-readable medium and including code that when executed on at least one processor causes the at least one processor to adjust a periodicity for performing a beam sweep. The beam sweep is a plurality of transmissions of a beam in a plurality of different transmit spatial directions by one of the base station or a UE and a plurality of scans of the beam transmissions in a plurality of different scan spatial directions by an other of the one of the base station or the UE. In addition, the code causes the at least one processor to send information indicating the adjusted periodicity for performing a beam sweep. Further, the code causes the at least one processor to perform the beam sweep at the adjusted periodicity.

In an aspect of the disclosure, a method, a computer program product, and an apparatus are provided. The apparatus may be a UE. The UE receives information indicating a periodicity for performing a beam sweep from a base station. In addition, the UE adjusts the periodicity for performing the beam sweep. The beam sweep is a plurality of transmissions of a beam in a plurality of different transmit spatial directions by one of the base station or the UE and a plurality of scans of the beam transmissions in a plurality of different scan spatial directions by an other of the one of the base station or the UE. Further, the UE performs the beam sweep at the adjusted periodicity.

In an aspect of the disclosure, the UE includes means for receiving information indicating a periodicity for performing a beam sweep from a base station. The UE further includes means for adjusting the periodicity for performing the beam sweep. The beam sweep is a plurality of transmissions of a beam in a plurality of different transmit spatial directions by one of the base station or the UE and a plurality of scans of the beam transmissions in a plurality of different scan spatial directions by an other of the one of the base station or the UE. The UE further includes means for performing the beam sweep at the adjusted periodicity.

In an aspect of the disclosure, the UE includes a memory and at least one processor coupled to the memory. The at least one processor is configured to receive information indicating a periodicity for performing a beam sweep from a base station. The at least one processor is further configured to adjust the periodicity for performing the beam sweep. The beam sweep is a plurality of transmissions of a beam in a plurality of different transmit spatial directions by one of the base station or the UE and a plurality of scans of the beam transmissions in a plurality of different scan spatial directions by an other of the one of the base station or the UE. The at least one processor is further configured to perform the beam sweep at the adjusted periodicity.

In an aspect of the disclosure, a computer program product stored on a computer-readable medium and including code that when executed on at least one processor causes the at least one processor to receive information indicating a periodicity for performing a beam sweep from a base station. In addition, the code causes the at least one processor to adjust the periodicity for performing the beam sweep. The beam sweep is a plurality of transmissions of a beam in a plurality of different transmit spatial directions by one of the base station or the UE and a plurality of scans of the beam transmissions in a plurality of different scan spatial directions by an other of the one of the base station or the UE. Further, the code causes the at least one processor to perform the beam sweep at the adjusted periodicity.

DETAILED DESCRIPTION

Figure 1:
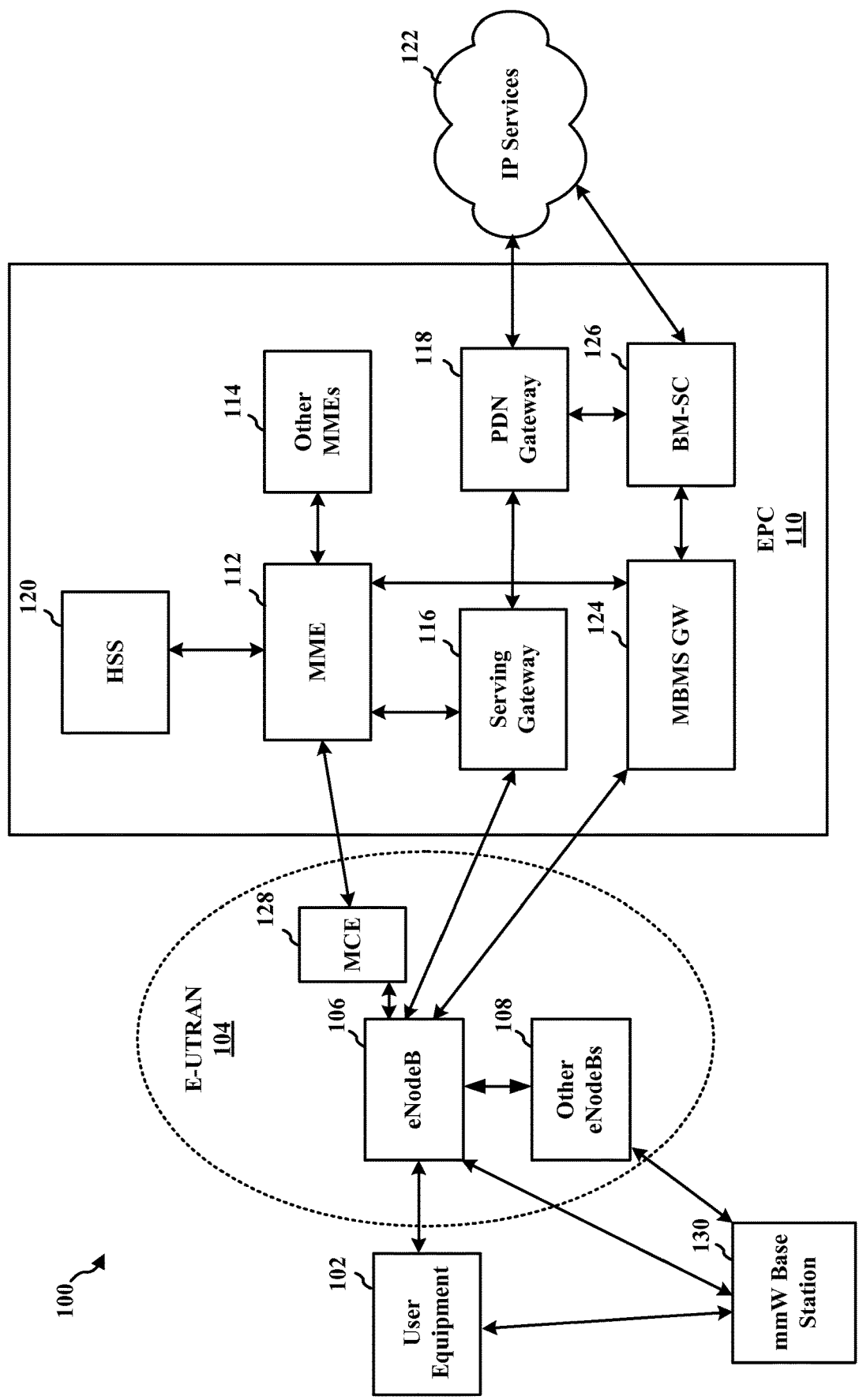
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating a network architecture 100. The network architecture 100 includes an LTE network architecture including one or more user equipment (UE) 102, an Evolved UMTS Terrestrial Radio Access Network (E-UTRAN) 104, and an Evolved Packet Core (EPC) 110. The network architecture 100 further includes a millimeter wavelength (mmW) network that includes an mmW base station 130 and the one or more UE 102. The LTE network architecture may be referred to as an Evolved Packet System (EPS). The EPS may include one or more UE 102, the E-UTRAN 104, the EPC 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
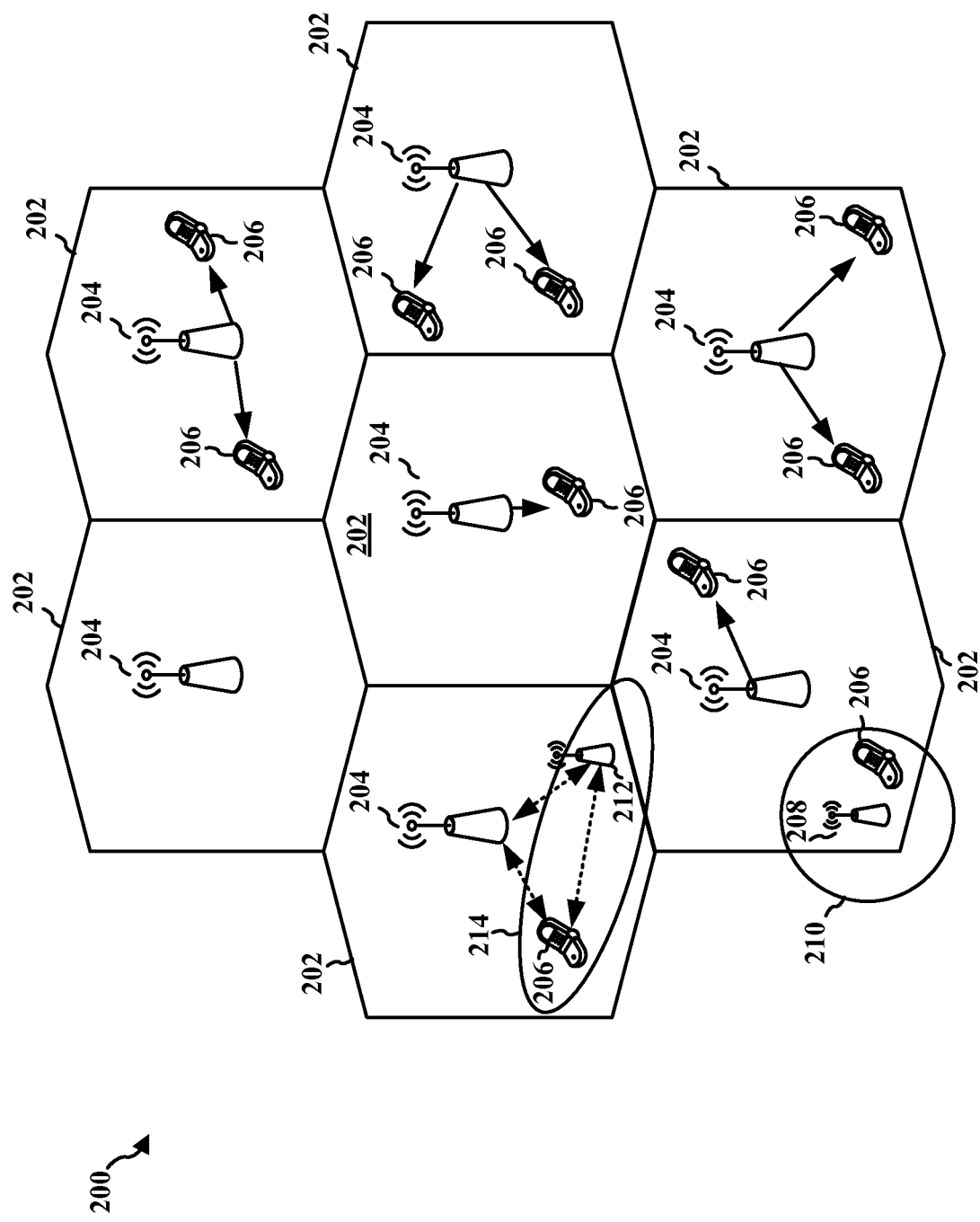
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). One or more mmW base stations 212 may have coverage regions 214 that overlap with one or more of the cells 202. The mmW base stations 212 may communicate with UEs 206 and macro eNBs 204. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
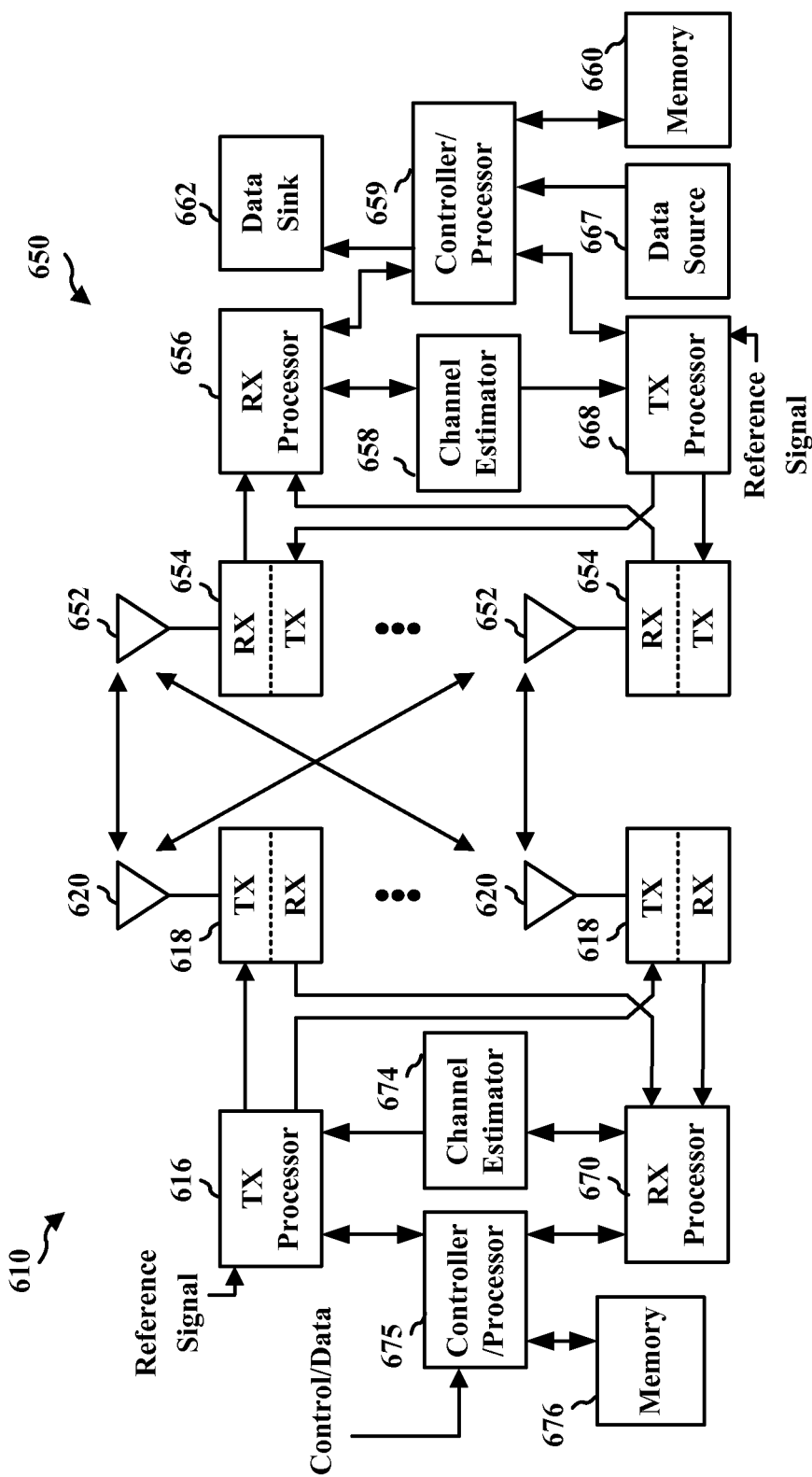
FIG. 3 is a diagram illustrating an example of an evolved Node B and user equipment in an access network.

FIG. 3 is a block diagram of a base station 610 in communication with a UE 650 in an access network. The base station 610 may be an eNB or an mmW base station. In the DL, upper layer packets from the core network are provided to a controller/processor 675. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the physical layer. The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate a radio frequency (RF) carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the physical layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 610. These soft decisions may be based on channel estimates computed by the channel estimator 658. The soft decisions are then decoded and deinterleaved to recover the data and control signals that were originally transmitted by the base station 610 on the physical channel. The data and control signals are then provided to the controller/processor 659.

The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents higher protocol layers. Various control signals may also be provided to the data sink 662 for processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents higher protocol layers. Similar to the functionality described in connection with the DL transmission by the base station 610, the controller/processor 659 provides header compression, ciphering, packet segmentation and reordering, and multiplexing between logical and transport channels based on radio resource allocations by the base station 610. The controller/processor 659 is also responsible for HARQ operations, retransmission of lost packets, and signaling to the base station 610.

Channel estimates derived by a channel estimator 658 from a reference signal or feedback transmitted by the base station 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the base station 610 in a manner similar to that described in connection with the receiver function at the UE 650. Each receiver 618RX receives a signal through its respective antenna 620. Each receiver 618RX recovers information modulated onto an RF carrier and provides the information to a RX processor 670.

The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

If the base station 610 is an mmW base station, the base station 610 may include hardware for performing analog and/or digital beamforming. Further, the UE 650 may include hardware for performing analog and/or digital beamforming.

Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave (mmW). Near mmW may extend down to a frequency of 3 GHz with a wavelength of 100 millimeters (the super high frequency (SHF) band extends between 3 GHz and 30 GHz, also referred to as centimeter wave). While the disclosure herein references mmWs, it should be understood that the disclosure also applies to near mmWs. Further, while the disclosure herein refers to an mmW base station, it should be understood that the disclosure also applies to near mmW base stations. The millimeter wavelength RF channel has extremely high path loss and a short range. In order to build a useful communication network in the millimeter wavelength spectrum, a beamforming technique may be used to compensate for the extreme high path loss. The beamforming technique focuses the RF energy into a narrow direction to allow the RF beam to propagate farther in that direction. Using the beamforming technique, non-line of sight (NLOS) RF communication in the millimeter wavelength spectrum may rely on reflection and/or diffraction of the beams to reach the UE. If the direction becomes blocked, either because of the UE movement or changes in the environment (e.g., obstacles, humidity, rain, etc.), the beam may not be able to reach the UE. Thus, in order to ensure that the UE has continuous, seamless coverage, multiple beams in as many different directions as possible may be available.

In order to provide a continuous and seamless coverage, each of several mmW base stations in the vicinity of the UE may measure a channel between the UE and the base station, and find the best beam directions the base station can transmit to reach the UE. In addition, each of the base stations may coordinate with other mmW base stations to determine which mmW base station has the best beam direction. Further, each of the base stations may plan for a secondary beam in case of a sudden change that can cause severe attenuation of the best beam.

For each UE, mmW base stations in the vicinity of the UE may form an active set for that UE. An anchor node for the active set may be chosen to coordinate the mmW base stations in the active set. The anchor node may or may not be an mmW base station. The anchor node may choose a particular direction from a particular base station in the active set to serve the UE. If the beam in that particular direction from that particular base station becomes blocked (or severely attenuated), the anchor node may choose another beam to keep the UE covered. The active set may evolve or adapt based on the mobility of the UE. The anchor node may add and/or remove mmW base stations to and from the active set as the UE moves closer to some mmW base stations and farther from other mmW base stations. In addition, the active set may allow the anchor node to coordinate the mmW base stations to perform handoffs. The active set may search for and keep track of beams from multiple base stations that can cover the UE. Coordination may be performed among the nodes in the active set to select the best beam, to change the beam in case of sudden severe attenuation, to perform handoffs, etc.

Beamforming techniques and methods for providing seamless and continuous coverage for a mobile UE in continuously changing wireless environments is provided infra.

Figure 4:
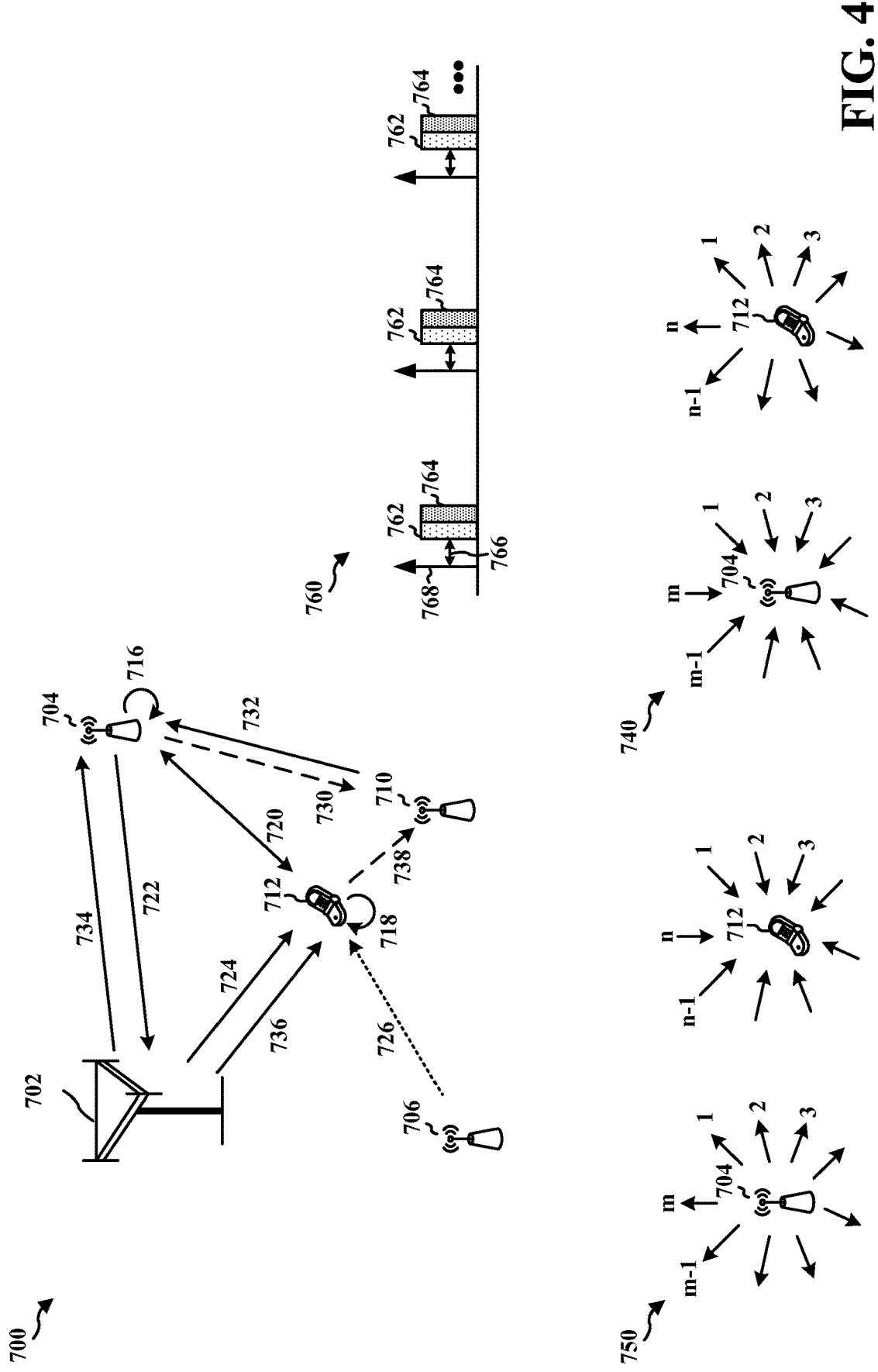
FIG. 4 is a diagram illustrating exemplary methods associated with coordinated operations of millimeter wavelength wireless access networks.

FIG. 4 is a diagram 700 illustrating exemplary methods associated with coordinated operations of mmW wireless access networks. The mmW base station 704, as well as the other mmW base stations 706, 710 may operate through a first network in the EHF or near EHF spectrum. The mmW base station 704 may receive synchronization/timing information 734 from the macro base station/eNB 702. The UE 712 may also receive synchronization/timing information 724 from the eNB 702. The mmW base station 704 and the UE 712 may receive the synchronization/timing information 734 and 724, respectively, through a second network (e.g., a LTE network) that operates with a lower carrier frequency (e.g., less than 3 GHz). Each of the mmW base station 704 and the UE 712 may synchronize a timing of the beam sweep based on the received synchronization/timing information. The timing of the beam sweep may be a timing offset 766 from a timing reference 768 associated with the synchronization/timing information.

The mmW base station 704 sends configuration information 722 to the eNB 702. The configuration information 722 may include information indicating a beam sweep period, a periodicity for the beam sweep, and/or a timing offset 766 from the synchronization/timing reference 768 of the eNB 702. The UE 712 may receive the configuration information in system information 736 received from the eNB 702. The system information 736 may be received through the lower carrier frequency network. Based on the received configuration information, the UE 712 adjusts 718 its beam sweep configuration to be compatible with the mmW base station 704.

Using the timing and configuration information of the mmW base station 704, the UE 712 performs a beam sweep 720 with the mmW base station 704. The beam sweep 720 may be performed during the mmW base station beam sweep broadcast period 762 and/or during the UE beam sweep broadcast period 764. The mmW base station beam sweep broadcast period 762 may be common to all mmW base stations within an active set. The UE beam sweep broadcast period 764 may be common to UEs that are served by the active set.

For the beam sweep 720, the mmW base station 704 may transmit during the broadcast period 762. Referring to the diagram 750, in the beam sweep broadcast period 762, the mmW base station 704 transmits m beams in a plurality of different directions. During the beam sweep broadcast period 762, the UE 712 listens/scans for the beam transmissions from the mmW base station 704 in n different receive directions. When listening/scanning for the beam transmissions with analog beamforming, the UE 712 may listen/scan for each beam direction of the m beam directions in each of the n different receive directions (a total of m*n scans). Alternatively, when listening/scanning for the beam transmissions with digital beamforming, the UE 712 may listen/scan for each beam direction of the m beam directions, and apply different weights (phase and/or amplitude changes) to determine a received signal for n different receive directions of the m transmissions (a total of m scans). Alternatively or in addition, for the beam sweep 720, the UE 712 may transmit during the beam sweep broadcast period 764. Referring to the diagram 740, in the beam sweep broadcast period 764, the UE 712 transmits n beams in a plurality of different directions. During the beam sweep broadcast period 764, the mmW base station 704 listens/scans for the beam transmissions from the UE 712 in m different receive directions. When listening/scanning for the beam transmissions with analog beamforming, the mmW base station 704 may listen/scan for each beam direction of the n beam directions in each of the m different receive directions (a total of m*n scans). Alternatively, when listening/scanning for the beam transmissions with digital beamforming, the mmW base station 704 may listen/scan for each beam direction of the n beam directions, and apply different weights (phase and/or amplitude changes) to determine a received signal for m different receive directions of the n transmissions (a total of n scans).

The UE 712 may perform a beam sweep with other mmW base stations, such as the mmW base stations 706 and 710. The UE 712 may determine a channel quality associated with each beam direction combination for each mmW base station. The channel quality may include one or more of a reference signal received power (RSRP), a reference signal received quality (RSRQ), or a signal to interference plus noise ratio (SINR). Further, the mmW base station 704 may perform a beam sweep with other UEs. The mmW base station 704 may determine a channel quality associated with each beam direction combination for each UE. Assume the mmW base station 710 is an anchor node for an active set that includes the mmW base station 704. The anchor node may also be referred to as a management node. The anchor node may change over time for a particular active set. The UE 712 may subsequently send the channel quality information 738 to the anchor node 710. The mmW base station 704 may also send the channel quality information 730 to the anchor node 710. The channel quality information 730, 738 may be sent directly or indirectly to the anchor node 710. For example, the UE 712 may transmit its channel quality information to the eNB 702, which may then send the channel quality information over the lower carrier network to the anchor node 710. For another example, the mmW base station 704 may send its channel quality information to the eNB 702, which may then send the channel quality information over the lower carrier network to the anchor node 710.

Based on the channel quality information and/or other information, the anchor node 710 may determine a periodicity of the beam sweep for the mmW base station 704. Referring to diagram 760, the anchor node 710 may increase/decrease a number of broadcast periods within each timing cycle 768 for the mmW base station 704 (in the diagram 760, only one mmW base station beam sweep broadcast period 762 and one UE beam sweep broadcast period 764 is shown in each timing cycle 768). The anchor node 710 may determine the periodicity for performing the beam sweep 720 based on one or more of the received channel quality information, a handoff state of the UE 712, or whether the mmW base station 704 is in an active set associated with serving one or more UEs. For example, if the UE 712 is in a harsh wireless channel environment, the anchor node 710 may increase the periodicity of the beam sweep 720 so that best beam directions can be determined more frequently for the UE 712 and the mmW base station 704. For another example, if the UE 712 is moving 726 in a handoff from the mmW base station 706 to the mmW base station 704, the anchor node 710 may increase the periodicity of the beam sweep 720 to facility the handoff transition, and may decrease the periodicity of the beam sweep 720 after the handoff is successfully completed. For yet another example, if the mmW base station is not in an active set for serving any UEs, the anchor node 710 may decrease the periodicity of the beam sweep 720 in order to save energy.

The anchor node 710 may send information 732 indicating the determined periodicity to the mmW base station 704. Accordingly, the anchor node 710 may dynamically control beam sweep periodicities for mmW base stations in an active set associated with the anchor node 710. Based on the received periodicity information 732, the mmW base station 704 may adjust 716 a periodicity for performing the beam sweep 720. Subsequently, the mmW base station 704 may send the information indicating the adjusted periodicity within the configuration information 722, as discussed supra.

Figure 5:
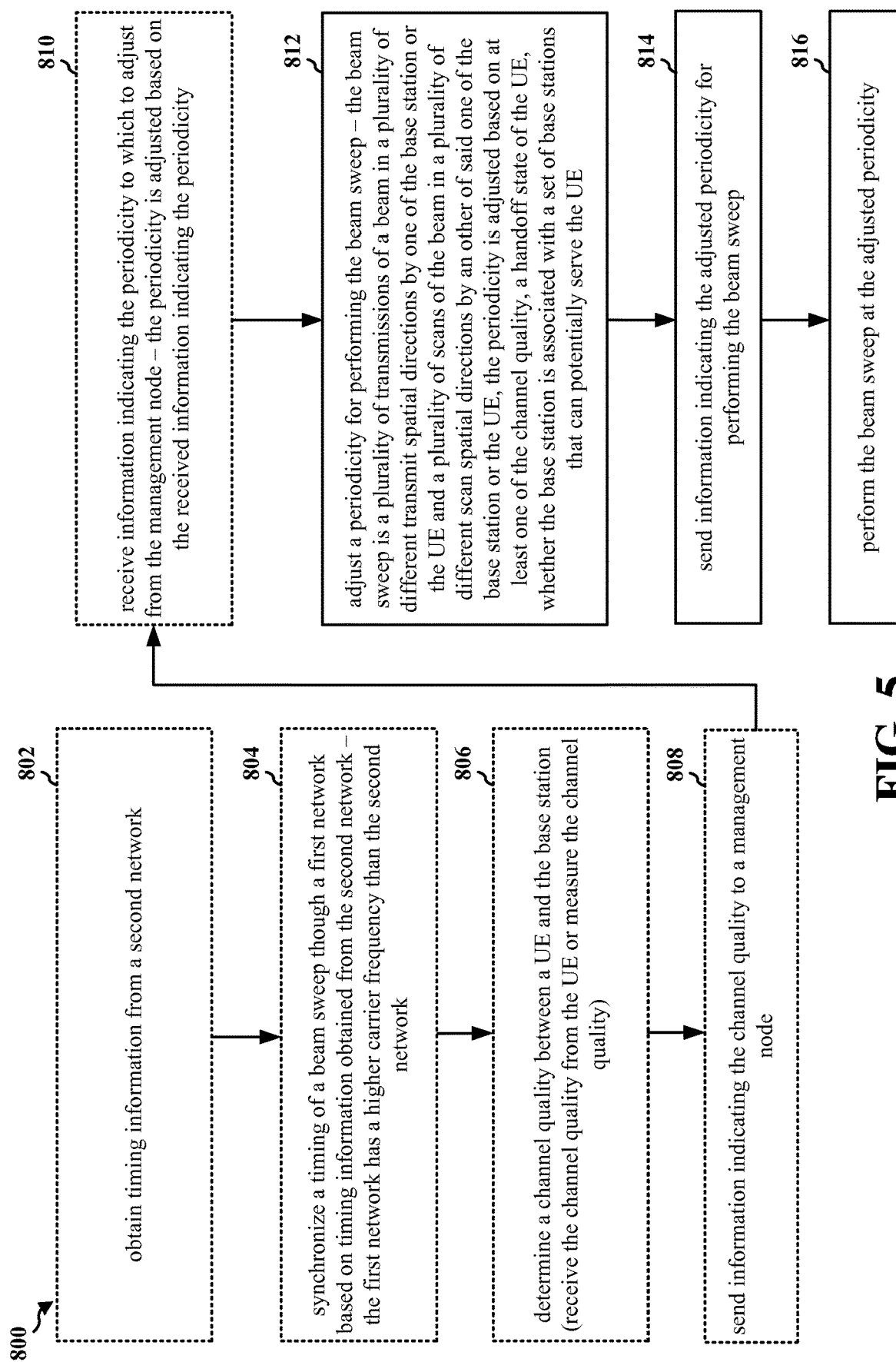
FIG. 5 is a flow chart of an exemplary method of wireless communication of a base station.

FIG. 5 is a flow chart 800 of an exemplary method of wireless communication of a base station. The method may be performed by a (near) mmW base station, such as the mmW base station 704. In block 812, the base station adjusts a periodicity for performing a beam sweep. The beam sweep is a plurality of transmissions of a beam in a plurality of different transmit spatial directions by one of the base station or a UE and a plurality of scans of the beam transmissions in a plurality of different scan spatial directions by an other of the one of the base station or the UE. For example, referring to FIG. 4, the mmW base station 704 adjusts 716 a periodicity for performing the beam sweep 720. As shown in the diagram 750, the beam sweep may be a plurality of transmissions of a beam in a plurality of different transmit spatial directions by the mmW base station 704 and a plurality of scans of the beam transmissions in a plurality of different scan spatial directions by the UE 712. Alternatively, as shown in the diagram 740, the beam sweep may be a plurality of transmissions of a beam in a plurality of different transmit spatial directions by the UE 712 and a plurality of scans of the beam transmissions in a plurality of different scan spatial directions by the mmW base station 704.

At block 814, the base station sends information indicating the adjusted periodicity for performing a beam sweep. For example, referring to FIG. 4, the mmW base station 704 sends information 722 indicating the adjusted periodicity for performing a beam sweep. The adjusted periodicity may be sent to the UE 712 as system information 736 through the eNB 702.

At block 816, the base station performs the beam sweep at the adjusted periodicity. For example, referring to FIG. 4, the mmW base station 704 performs the beam sweep 720 at the adjusted periodicity. As discussed supra, in one configuration (see diagram 750), performing the beam sweep may include transmitting m beams to the set of UEs. Each beam is transmitted in one transmit spatial direction of m different transmit spatial directions of the base station. In another configuration (see diagram 740), performing the beam sweep may include scanning for n beams from the UE. Each beam is associated with a different transmit spatial direction of n different transmit spatial directions of the UE.

As discussed supra, the beam sweep may be performed in a first network and the information indicating the adjusted periodicity may be sent in a second network. The first network has a higher carrier frequency than the second network. In addition, the information indicating the adjusted periodicity may be sent over the second network as system information. For example, referring to FIG. 4, the beam sweep 720 may be performed in a first network (e.g., mmW network) and the information 722 indicating the adjusted periodicity may be sent in a second network (e.g., LTE network). The first network has a higher carrier frequency than the second network. For example, the first network may have a carrier frequency between 30 GHz and 300 GHz (EHF band), and more broadly between 3 GHz and 300 GHz (EHF band and near EHF band, which includes the EHF band and a portion of the SHF band). Further, the second network may have a carrier frequency less than 3 GHz. Generally, the first network may have a carrier frequency between x GHz and 300 GHz. In one configuration, x is 30 GHz. In another configuration, x is between 3 GHz and 30 GHz. In such a configuration, the second network has a carrier frequency less than x GHz. The mmW base station 704 may send the information 722 indicating the adjusted periodicity through the second network via the eNB 702 as system information 736.

In one configuration, the base station serves a UE and, at block 812, the periodicity is adjusted based on a channel quality of the UE. At block 806, the base station determines the channel quality between the UE and the base station. At block 812, the base station adjusts the periodicity by increasing the periodicity of performing the beam sweep when the channel quality is less than a threshold. The base station adjusts the periodicity by decreasing the periodicity of performing the beam sweep when the channel quality is greater than a threshold. For example, referring to FIG. 4, the mmW base station 704 serves the UE 712. The mmW base station 704 may adjust 716 the periodicity based on a channel quality of the UE 712. The mmW base station 704 may determine the channel quality between the UE 712 and the mmW base station 704 based on a previous beam sweep. The mmW base station 704 may adjust the periodicity by increasing the periodicity of performing the beam sweep 720 when the channel quality is less than a threshold. The mmW base station 704 may adjust the periodicity by decreasing the periodicity of performing the beam sweep 720 when the channel quality is greater than a threshold.

In one configuration, at block 812, the periodicity is adjusted based on a handoff state of the UE. In such a configuration, the base station may increase the periodicity of performing the beam sweep when the base station is receiving a UE from another base station in a handoff, and decrease the periodicity of performing the beam sweep after the base station receives the UE successfully from another base station in a handoff. For example, referring to FIG. 4, the mmW base station 704 may adjust the periodicity based on a handoff state of the UE 712. The mmW base station 704 may increase the periodicity of performing the beam sweep when the mmW base station 704 is receiving the UE 712 from a source mmW base station (e.g., the mmW base station 706) in a handoff, and decrease the periodicity of performing the beam sweep after the mmW base station 704 receives the UE 712 successfully from the source mmW base station.

In one configuration, at block 812, the periodicity is adjusted based on whether the base station is associated with a set of base stations that can potentially serve a UE. In such a configuration, the base station may increase the periodicity of performing the beam sweep when the base station is associated with any set of base stations that can potentially serve a UE, and may decrease the periodicity of performing the beam sweep when the base station is unassociated with any set of base stations for providing services for any UEs. For example, referring to FIG. 4, the mmW base station 704 may adjust the periodicity based on whether the mmW base station 704 is associated with a set of base stations (active set) that can potentially serve a UE. The mmW base station 704 may increase the periodicity of performing the beam sweep when the mmW base station 704 is associated with any set of mmW base stations that can potentially serve a UE, and may decrease the periodicity of performing the beam sweep when the mmW base station 704 is unassociated with any set of base stations for providing services for any UEs.

At block 806, the base station determines a channel quality between a UE and the base station. When the base station transmits the beams in the beam sweep (see diagram 750), the base station may receive channel quality information from the UE. When the UE transmits the beams in the beam sweep, the base station may measure the channel quality between the UE and the base station based on the beam sweep. Subsequently, at block 808, the base station sends information indicating the channel quality to a management node. For example, referring to FIG. 4, the mmW base station 704 sends channel quality information 730 to the anchor/management node 710. At block 810, the base station receives information indicating the periodicity to which to adjust from the management node. The information indicating the periodicity may be based on the measured channel quality. The periodicity may be adjusted based on the received information indicating the periodicity. For example, referring to FIG. 4, the mmW base station 704 receives information 732 indicating the periodicity to which to adjust from the anchor/management node 710. The information 732 indicating the periodicity may be based on the measured channel quality. The mmW base station 704 may adjust 716 the periodicity based on the received information 732 indicating the periodicity.

At block 802, the base station may obtain timing information from a second network. At block 804, the base station may synchronize a timing of the beam sweep through the first network based on the timing information obtained from the second network. The first network has a higher carrier frequency than the second network. For example, referring to FIG. 4, the mmW base station 704 may obtain timing information 734 (768) from a second network. The mmW base station 704 may synchronize a timing of the beam sweep 720 through the first network based on the timing information 734 obtained from the second network. To synchronize a timing of the beam sweep 720, the mmW base station 704 may apply a timing offset 766 with respect to the timing 768 received from the eNB 702 for the beam sweep broadcast periods 762, 764.

Figure 6:
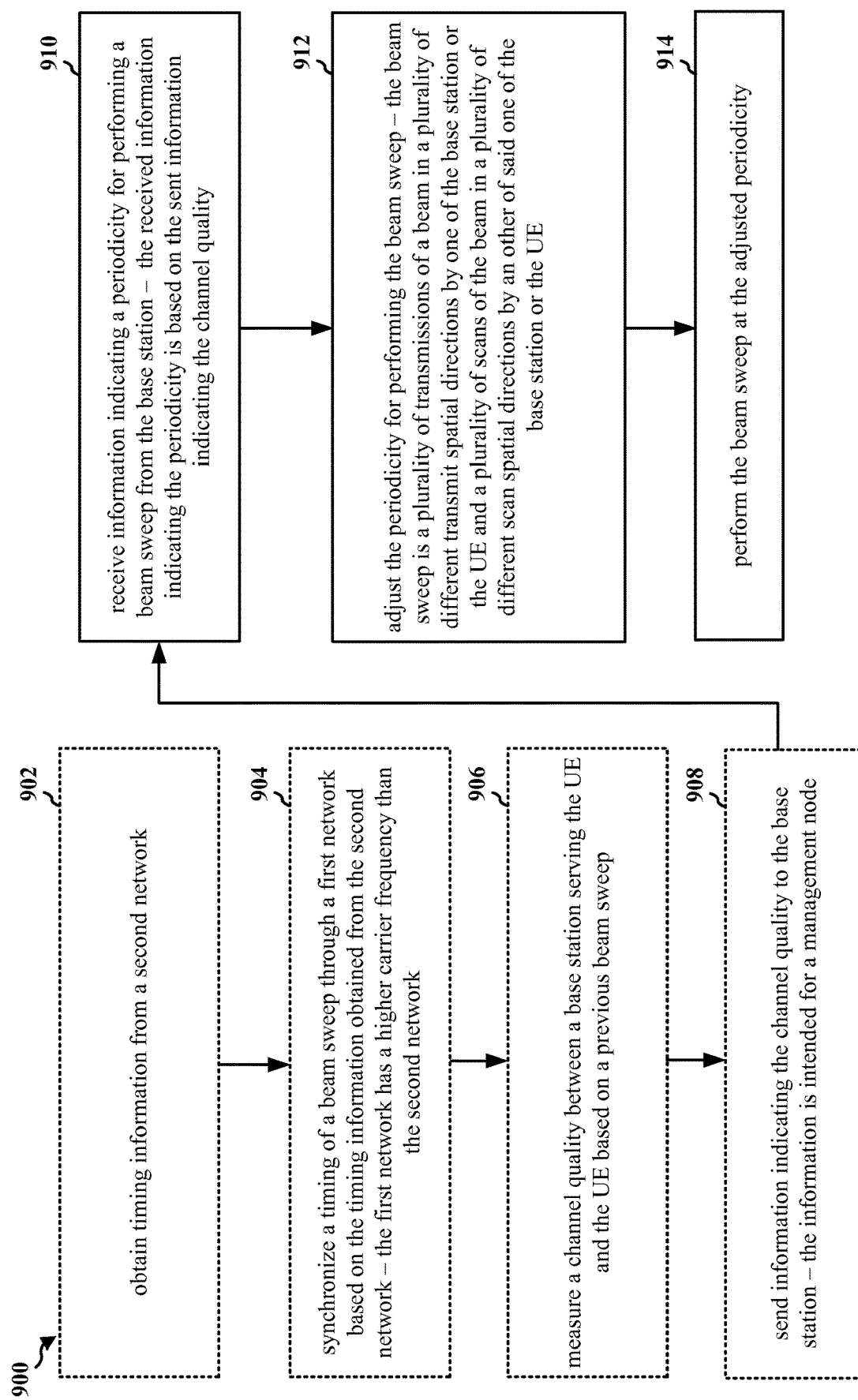
FIG. 6 is a flow chart of an exemplary method of wireless communication of a UE.

FIG. 6 is a flow chart 900 of an exemplary method of wireless communication of a UE. At block 910, the UE receives information indicating a periodicity for performing a beam sweep from a base station. At block 912, the UE adjusts the periodicity for performing the beam sweep. The beam sweep is a plurality of transmissions of a beam in a plurality of different transmit spatial directions by one of the base station or the UE and a plurality of scans of the beam transmissions in a plurality of different scan spatial directions by an other of the one of the base station or the UE. At block 914, the UE performs the beam sweep at the adjusted periodicity. For example, referring to FIG. 4, the UE 712 receives information 736 indicating a periodicity for performing a beam sweep. The UE 712 may receive the information 736 from the mmW base station 704, either directly from the mmW base station 704 or indirectly via from the eNB 702. The UE 712 adjusts 718 the periodicity for performing the beam sweep 720. The beam sweep 720 is a plurality of transmissions of a beam in a plurality of different transmit spatial directions by one of the base station or the UE and a plurality of scans of the beam transmissions in a plurality of different scan spatial directions by an other of the one of the base station or the UE. The UE performs the beam sweep 720 at the adjusted periodicity.

In one configuration, at block 910, the UE receives the information indicating the adjusted periodicity in a second network, and at block 914, the UE performs the beam sweep in a first network. The first network has a higher carrier frequency than the second network. At block 910, the UE may receive the information indicating the adjusted periodicity over the second network as system information.

In one configuration, at block 914, the UE performs the beam sweep by transmitting n beams to the base station. In such a configuration, each beam is transmitted in one transmit spatial direction of n different transmit spatial directions of the UE. In another configuration, the UE performs the beam sweep by scanning for m beams from the base station. In such a configuration, each beam is associated with a different transmit spatial direction of m different transmit spatial directions of the base station.

At block 906, the UE measures a channel quality between the base station and the UE based on a previous beam sweep. At block 908, the UE sends information indicating the channel quality to the base station. The information is intended for a management node. When the UE sends information indicating the channel quality to the base station at block 908, the received information indicating the periodicity at block 910 may be based on the sent information indicating the channel quality. For example, referring to FIG. 4, the UE 712 may measure a channel quality between the mmW base station 704 and the UE 712 based on a previous beam sweep. The UE 712 may send information 738 indicating the channel quality to the mmW base station 704. The information is intended for the anchor/management node 710. After sending the channel quality information, the UE 712 may receive information 736 indicating the periodicity in which the periodicity is based on the sent channel quality information.

At block 902, the UE obtains timing information from a second network. At block 904, the UE synchronizes a timing of the beam sweep through a first network based on the timing information obtained from the second network. The first network has a higher carrier frequency than the second network. For example, referring to FIG. 4, the UE 712 obtains timing information 724 (768) from a second network. The UE 712 synchronizes a timing of the beam sweep 720 through the first network based on the timing information 724 obtained from the second network. To synchronize a timing of the beam sweep 720, the UE 712 may apply a timing offset 766 with respect to the timing 768 received from the eNB 702 for the beam sweep broadcast periods 762, 764.

Figure 7:
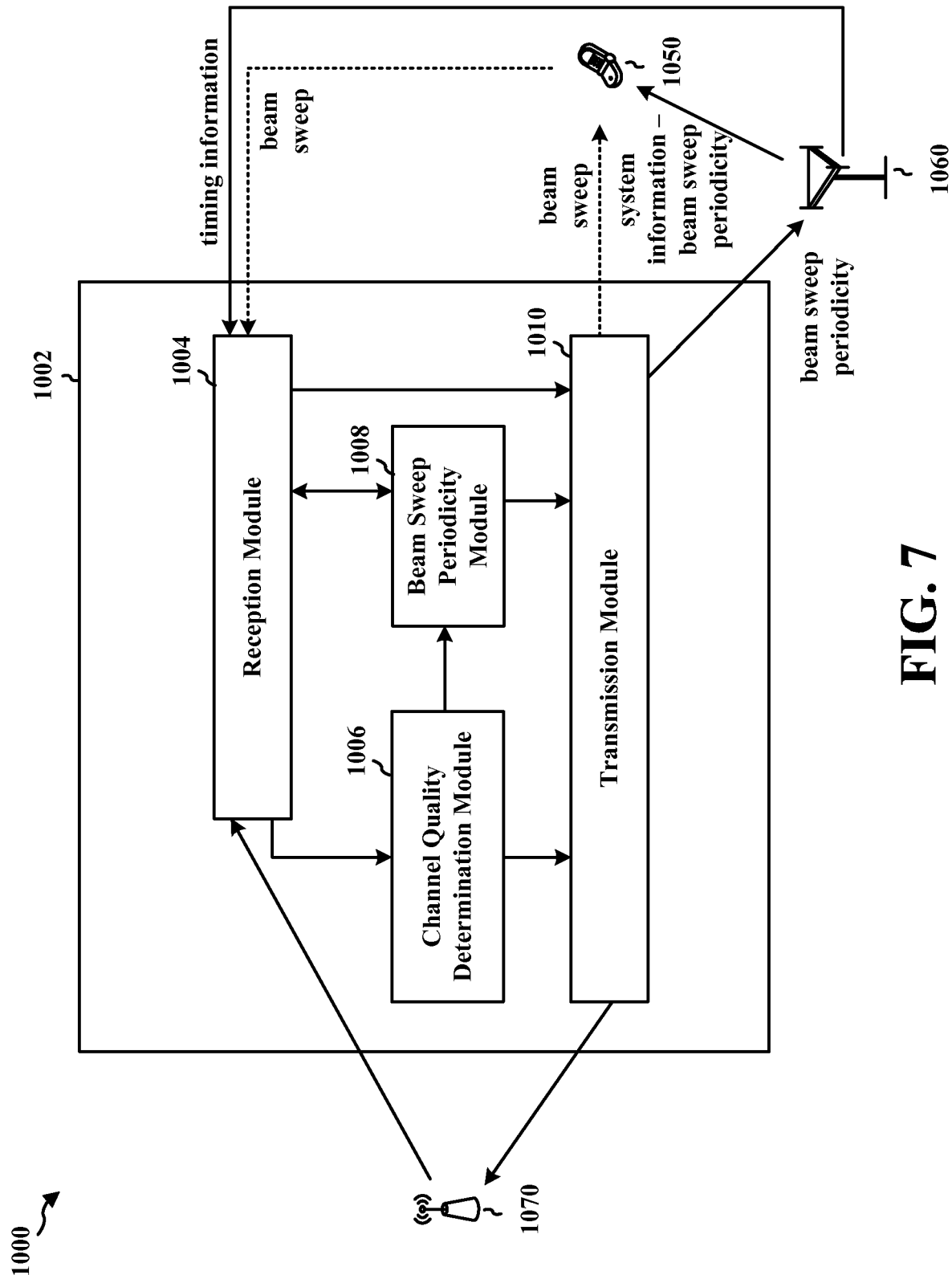
FIG. 7 is a data flow diagram illustrating the data flow between different modules/means/components in an exemplary (near) millimeter wave base station apparatus.

FIG. 7 is a data flow diagram 1000 illustrating the data flow between different modules/means/components in an exemplary (near) mmW base station apparatus 1002. The base station 1002 includes a beam sweep periodicity module 1008 that is configured to adjust a periodicity for performing a beam sweep. The beam sweep is a plurality of transmissions of a beam in a plurality of different transmit spatial directions by one of the base station 1002 or a UE 1050 and a plurality of scans of the beam transmissions in a plurality of different scan spatial directions by an other of the one of the base station 1002 or the UE 1050. The base station 1002 further includes a transmission module 1010 that is configured to send information indicating the adjusted periodicity for performing a beam sweep. The base station 1002 further includes a reception module 1004. The reception module 1004 (see diagram 740) and/or the transmission module 1010 (see diagram 750) are configured to perform the beam sweep at the adjusted periodicity.

The reception module 1004/transmission module 1010 may be configured to perform the beam sweep in a first network. The transmission module 1004 may be configured to send the information indicating the adjusted periodicity in a second network (e.g., through the eNB 1060). The first network has a higher carrier frequency than the second network. The transmission module 1010 may be configured to send the information indicating the adjusted periodicity over the second network as system information.

When the base station 1002 serves the UE 1050, the beam sweep periodicity module 1008 may be configured to adjust the periodicity based on a channel quality of the UE 1050. The base station 1002 may further include a channel quality determination module 1006 that is configured to determine the channel quality between the UE 1050 and the base station 1002. The beam sweep periodicity module 1008 may be configured to adjust the periodicity by increasing the periodicity of performing the beam sweep when the channel quality is less than a threshold. The beam sweep periodicity module 1008 may be configured to adjust the periodicity by decreasing the periodicity of performing the beam sweep when the channel quality is greater than a threshold.

The beam sweep periodicity module 1008 may be configured to adjust the periodicity based on a handoff state of the UE 1050. The beam sweep periodicity module 1008 may be configured to increase the periodicity of performing the beam sweep when the base station 1002 is receiving the UE 1050 from another base station in a handoff, and to decrease the periodicity of performing the beam sweep after the base station 1002 receives the UE 1050 successfully from another base station in a handoff.

The beam sweep periodicity module 1008 may be configured to adjust the periodicity based on whether the base station 1002 is associated with a set of base stations (active set) that can potentially serve a UE. The beam sweep periodicity module 1008 may be configured to increase the periodicity of performing the beam sweep when the base station 1002 is associated with any set of base stations that can potentially serve a UE, and to decrease the periodicity of performing the beam sweep when the base station 1002 is unassociated with any set of base stations for providing services for any UEs.

As discussed supra, the base station 1002 may serve a set of UEs. The transmission module 1010 may be configured to perform the beam sweep by transmitting m beams to the set of UEs. Each beam is transmitted in one transmit spatial direction of m different transmit spatial directions of the base station 1002. Alternatively or in addition, the reception module 1004 may be configured to perform the beam sweep by scanning for n beams from the UE 1050. Each beam is associated with a different transmit spatial direction of n different transmit spatial directions of the UE 1050.

The channel quality determination module 1006 may be configured to measure a channel quality between the UE 1050 and the base station 1002 based on a previous beam sweep. The transmission module 1010 may be configured to send information indicating the channel quality to a management node 1070. The reception module 1004 may be configured to receive information indicating the periodicity to which to adjust from the management node 1070. The information indicating the periodicity may be based on the measured channel quality. The periodicity may be adjusted based on the received information indicating the periodicity.

The reception module 1004 and/or the transmission module 1010 may be configured to perform the beam sweep in a first network. The reception module 1004 may be configured to obtain timing information from a second network (e.g., from the eNB 1060). The first network has a higher carrier frequency than the second network. The reception module 1004 and/or the transmission module 1010 may be configured to synchronize a timing of the beam sweep based on the timing information obtained from the second network.

The apparatus may include additional modules that perform each of the blocks of the algorithm in the aforementioned flow chart of FIG. 5. As such, each block in the aforementioned flow chart of FIG. 5 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 8:
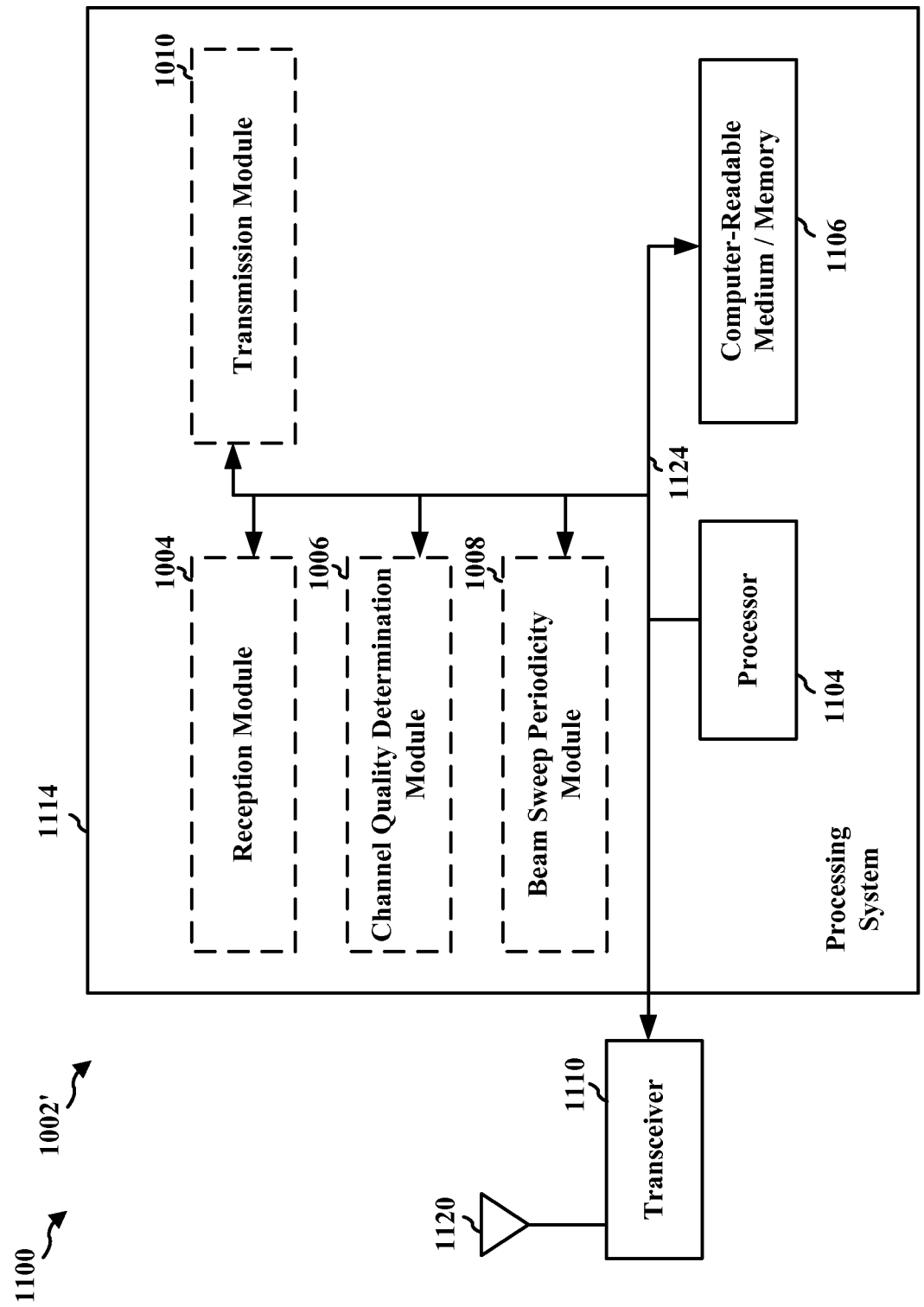
FIG. 8 is a diagram illustrating an example of a hardware implementation for a (near) millimeter wave base station apparatus employing a processing system.

FIG. 8 is a diagram illustrating an example of a hardware implementation for a (near) millimeter wave base station apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, and 1010, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114. In addition, the transceiver 1110 receives information from the processing system 1114, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the modules 1004, 1006, 1008, and 1010. The modules may be software modules running in the processor 1104, resident/stored in the computer readable medium/memory 1106, one or more hardware modules coupled to the processor 1104, or some combination thereof. The processing system 1114 may be a component of the eNB 610 and may include the memory 676 and/or at least one of the TX processor 616, the RX processor 670, and the controller/processor 675.

In one configuration, the apparatus 1002/1002' for wireless communication is a base station and includes means for adjusting a periodicity for performing a beam sweep. The beam sweep is a plurality of transmissions of a beam in a plurality of different transmit spatial directions by one of the base station or a UE and a plurality of scans of the beam transmissions in a plurality of different scan spatial directions by an other of the one of the base station or the UE. The base station further includes means for sending information indicating the adjusted periodicity for performing a beam sweep. The base station further includes means for performing the beam sweep at the adjusted periodicity. In one configuration, the base station serves a UE and the periodicity is adjusted based on a channel quality of the UE. In such a configuration, the base station may further include means for determining the channel quality between the UE and the base station. The means for adjusting may be configured to adjust the periodicity by increasing the periodicity of performing the beam sweep when the channel quality is less than a threshold. The means for adjusting may be configured to adjust the periodicity by decreasing the periodicity of performing the beam sweep when the channel quality is greater than a threshold. In one configuration, the periodicity is adjusted based on a handoff state of the UE. In such a configuration, the means for adjusting may be configured to increase the periodicity of performing the beam sweep when the base station is receiving a UE from another base station in a handoff. Further, in such a configuration, the means for adjusting may be configured to adjust the periodicity by decreasing the periodicity of performing the beam sweep after the base station receives the UE successfully from another base station in a handoff. In one configuration, the periodicity is adjusted based on whether the base station is associated with a set of base stations that can potentially serve a UE. In such a configuration, the means for adjusting may be configured to increase the periodicity of performing the beam sweep when the base station is associated with any set of base stations that can potentially serve a UE. Further, in such a configuration, the means for adjusting may be configured to decrease the periodicity of performing the beam sweep when the base station is unassociated with any set of base stations for providing services for any UEs. In one configuration, the base station serves a set of UEs and the means for performing the beam sweep is configured to transmit m beams to the set of UEs. Each beam is transmitted in one transmit spatial direction of m different transmit spatial directions of the base station. In one configuration, the base station serves a UE and the means for performing the beam sweep is configured to scan for n beams from the UE. Each beam is associated with a different transmit spatial direction of n different transmit spatial directions of the UE. In one configuration, the base station further includes means for measuring a channel quality between the UE and the base station based on a previous beam sweep, means for sending information indicating the channel quality to a management node, and means for receiving information indicating the periodicity to which to adjust from the management node. The information indicating the periodicity may be based on the measured channel quality. The periodicity may be adjusted based on the received information indicating the periodicity. In one configuration, the beam sweep is performed in a first network, and the base station further includes means for obtaining timing information from a second network. The first network has a higher carrier frequency than the second network. In such a configuration, the base station further includes means for synchronizing a timing of the beam sweep based on the timing information obtained from the second network.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 9:
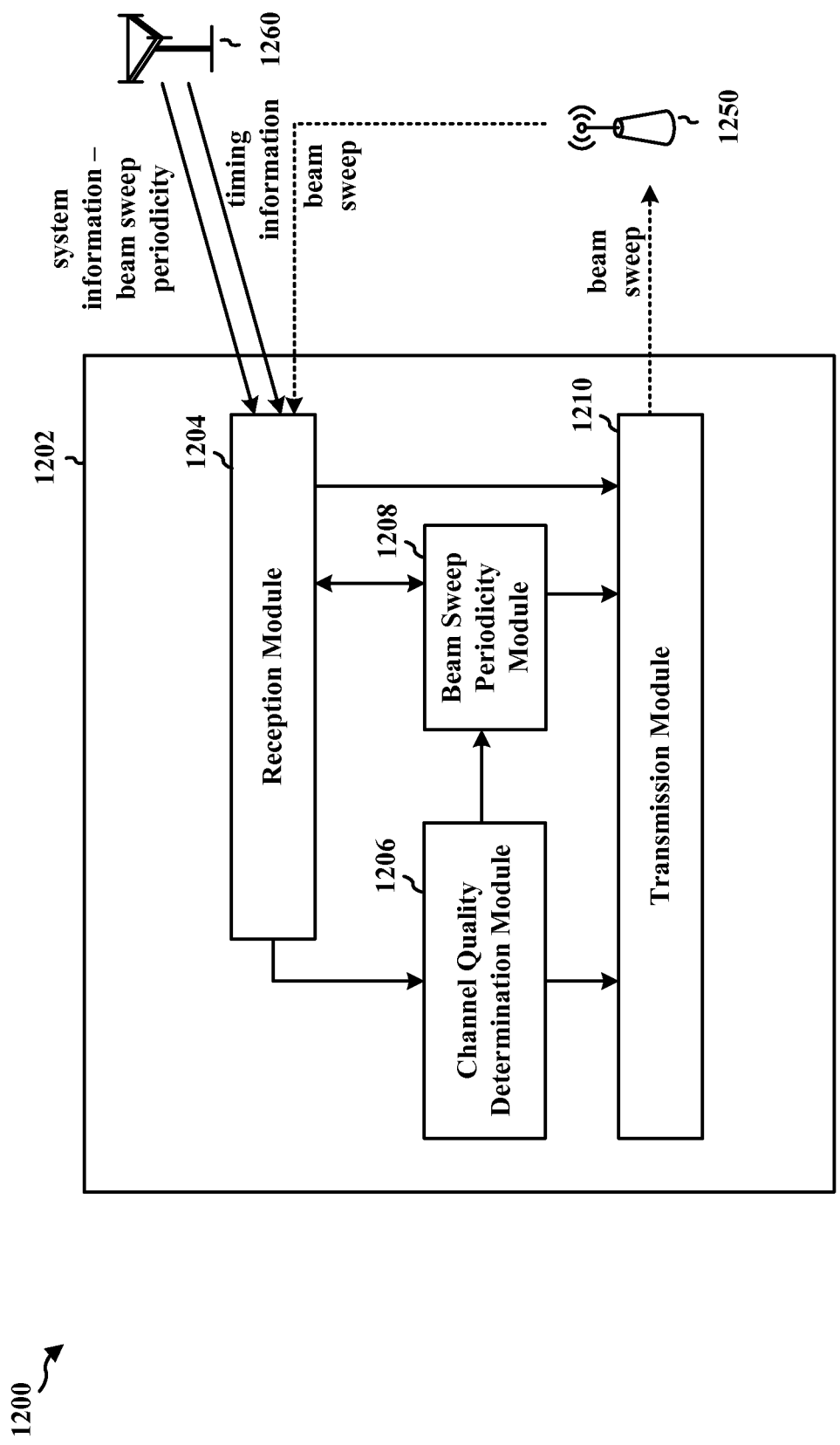
FIG. 9 is a data flow diagram illustrating the data flow between different modules/means/components in an exemplary UE apparatus.

FIG. 9 is a data flow diagram 1200 illustrating the data flow between different modules/means/components in an exemplary UE apparatus 1202. The UE 1202 includes a reception module 1204 that is configured to receive information indicating a periodicity for performing a beam sweep from a base station 1250 serving the UE 1202. The UE 1202 further includes a beam sweep periodicity module 1208 that is configured to adjust the periodicity for performing the beam sweep. The beam sweep is a plurality of transmissions of a beam in a plurality of different transmit spatial directions by one of the base station 1250 or the UE 1202 and a plurality of scans of the beam transmissions in a plurality of different scan spatial directions by an other of the one of the base station 1250 or the UE 1202. The beam sweep periodicity module 1208 communicates with a reception module 1204 and/or a transmission module 1210 so that the reception module 1204 and/or transmission module 1210 perform the beam sweep at the adjusted periodicity.

The reception module 1204 and/or the transmission module 1210 may be configured to perform the beam sweep in a first network. The reception module 1204 may be configured to receive information indicating the adjusted periodicity in a second network (e.g., through the eNB 1260). The first network has a higher carrier frequency than the second network. The reception module 1204 may be configured to receive the information indicating the adjusted periodicity over the second network as system information. The transmission module 1210 may be configured to perform the beam sweep by transmitting n beams to the base station. Each beam is transmitted in one transmit spatial direction of n different transmit spatial directions of the UE. The reception module 1204 may be configured to perform the beam sweep by scanning for m beams from the base station. Each beam is associated with a different transmit spatial direction of m different transmit spatial directions of the base station.

The UE 1202 may further include a channel quality determination module 1206 that is configured to measure a channel quality between the base station 1250 and the UE 1202 based on a previous beam sweep. The transmission module 1210 may be configured to send information indicating the channel quality to the base station. The information may be intended for a management node. The received information indicating the periodicity may be based on the sent information indicating the channel quality.

The transmission module 1210 may be configured to perform the beam sweep in a first network. The reception module 1204 may be configured to obtain timing information from a second network (e.g., from the eNB 1260). The first network has a higher carrier frequency than the second network. The beam sweep periodicity module 1208 may be configured to synchronize a timing of the beam sweep based on the timing information obtained from the second network.

The apparatus may include additional modules that perform each of the blocks of the algorithm in the aforementioned flow chart of FIG. 6. As such, each block in the aforementioned flow chart of FIG. 6 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
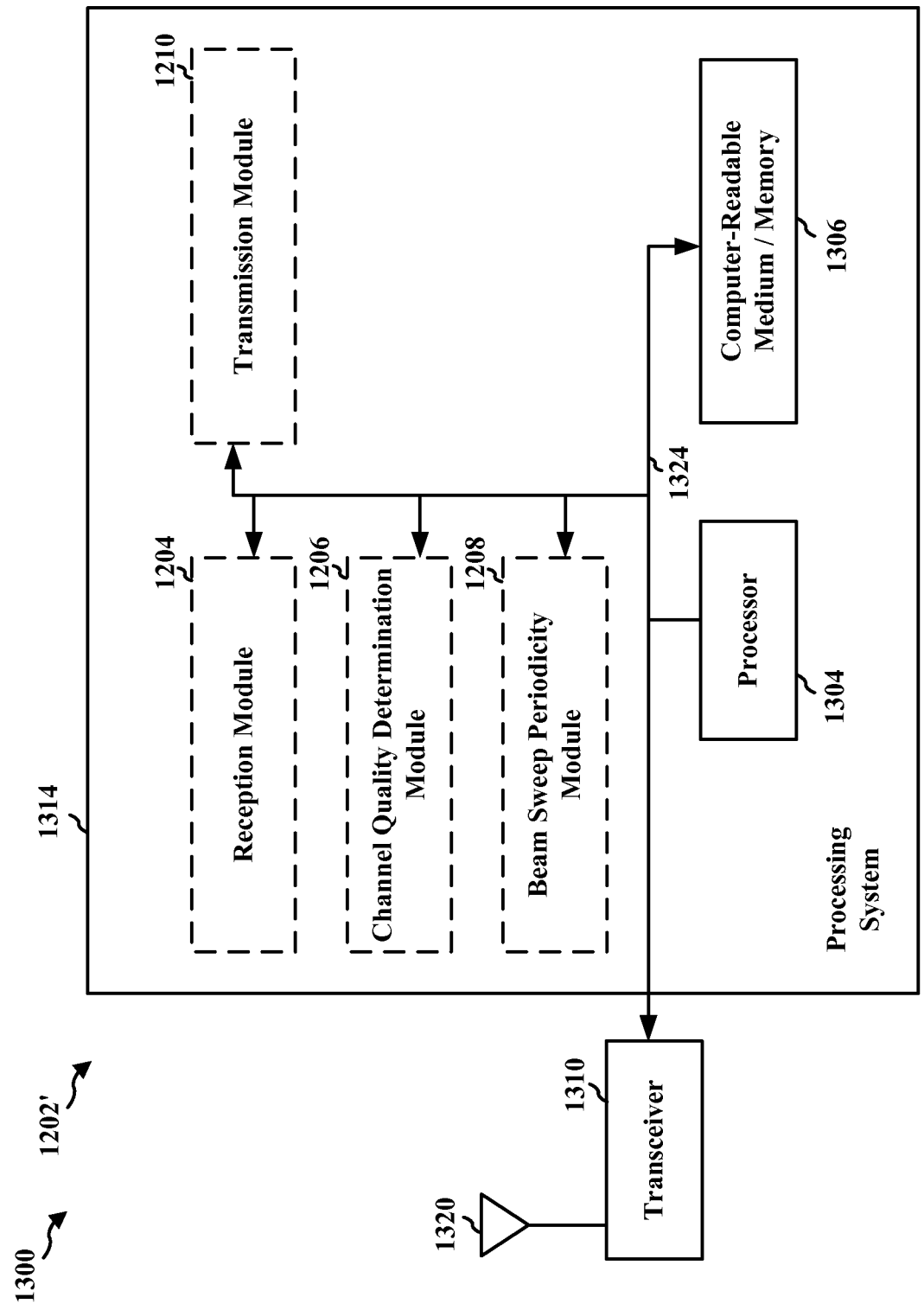
FIG. 10 is a diagram illustrating an example of a hardware implementation for a UE apparatus employing a processing system.

FIG. 10 is a diagram 1300 illustrating an example of a hardware implementation for a UE apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, and 1210 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314. In addition, the transceiver 1310 receives information from the processing system 1314, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the modules 1204, 1206, 1208, and 1210. The modules may be software modules running in the processor 1304, resident/stored in the computer readable medium/memory 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for wireless communication is a UE and includes means for receiving information indicating a periodicity for performing a beam sweep from a base station, and means for adjusting the periodicity for performing the beam sweep. The beam sweep is a plurality of transmissions of a beam in a plurality of different transmit spatial directions by one of the base station or the UE and a plurality of scans of the beam transmissions in a plurality of different scan spatial directions by an other of the one of the base station or the UE. The UE further includes means for performing the beam sweep at the adjusted periodicity. In one configuration, the means for performing the beam sweep is configured to transmitting n beams to the base station. Each beam is transmitted in one transmit spatial direction of n different transmit spatial directions of the UE. In one configuration, the means for performing the beam sweep is configured to scan for m beams from the base station. Each beam is associated with a different transmit spatial direction of m different transmit spatial directions of the base station. In one configuration, the UE includes means for measuring a channel quality between the base station and the UE based on a previous beam sweep, and means for sending information indicating the channel quality to the base station. The information is intended for a management node. The received information indicating the periodicity is based on the sent information indicating the channel quality. In one configuration, the beam sweep is performed in a first network, and the UE further includes means for obtaining timing information from a second network. The first network has a higher carrier frequency than the second network. In such a configuration, the UE further includes means for synchronizing a timing of the beam sweep based on the timing information obtained from the second network.

The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a base station, comprising:
   obtaining timing information from a second network having a lower carrier frequency than a first network, the first network being a millimeter wave (mmW) network;
   synchronizing a timing of a beam sweep in the first network based on the timing information obtained from the second network;
   adjusting a periodicity for performing the beam sweep in the first network, the beam sweep being a plurality of transmissions of a beam in a plurality of different transmit spatial directions by one of the base station or a user equipment (UE) and a plurality of scans of the beam transmissions in a plurality of different scan spatial directions by an other of said one of the base station or the UE;
   sending, by the base station in the second network, information indicating the adjusted periodicity for performing the beam sweep; and
   performing, by the base station, the beam sweep in the first network at the adjusted periodicity.

2. The method of claim 1, wherein the second network is at least one of a long term evolution (LTE) network or a network having a carrier frequency that is less than 3 gigahertz (GHz).

3. The method of claim 1, wherein the information indicating the adjusted periodicity is sent over the second network as system information.

4. The method of claim 1, wherein the base station serves a UE and the periodicity is adjusted based on a channel quality of the UE, the method further comprises determining the channel quality between the UE and the base station, and the periodicity is adjusted by increasing the periodicity of performing the beam sweep when the channel quality is less than a threshold.

5. The method of claim 1, wherein the base station serves a UE and the periodicity is adjusted based on a channel quality of the UE, the method further comprises determining the channel quality between the UE and the base station, and the periodicity is adjusted by decreasing the periodicity of performing the beam sweep when the channel quality is greater than a threshold.

6. The method of claim 1, wherein the periodicity is adjusted based on a handoff state of the UE, the method further comprising increasing the periodicity of performing the beam sweep when the base station is receiving a UE from another base station in a handoff.

7. The method of claim 1, wherein the periodicity is adjusted based on a handoff state of the UE, the method further comprising decreasing the periodicity of performing the beam sweep after the base station receives the UE successfully from another base station in a handoff.

8. The method of claim 1, wherein the periodicity is adjusted based on whether the base station is associated with a set of base stations that can potentially serve a UE, the method further comprising increasing the periodicity of performing the beam sweep when the base station is associated with any set of base stations that can potentially serve a UE.

9. The method of claim 1, wherein the periodicity is adjusted based on whether the base station is associated with a set of base stations that can potentially serve a UE, the method further comprising decreasing the periodicity of performing the beam sweep when the base station is unassociated with any set of base stations for providing services for any UEs.

10. The method of claim 1, wherein the base station serves a set of UEs and the performing the beam sweep comprises transmitting m beams to the set of UEs, each beam being transmitted in one transmit spatial direction of m different transmit spatial directions of the base station.

11. The method of claim 1, wherein the base station serves a UE and the performing the beam sweep comprises scanning for n beams from the UE, each beam being associated with a different transmit spatial direction of n different transmit spatial directions of the UE.

12. The method of claim 11, further comprising:
measuring a channel quality between the UE and the base station based on a previous beam sweep;
sending information indicating the channel quality to a management node; and
receiving information indicating the periodicity to which to adjust from the management node, the information indicating the periodicity being based on the measured channel quality, the periodicity being adjusted based on the received information indicating the periodicity.

13. A method of wireless communication of a user equipment (UE), comprising:
obtaining timing information from a second network having a lower carrier frequency than a first network, the first network being a millimeter wave (mmW) network;
synchronizing a timing of a beam sweep in the first network based on the timing information obtained from the second network;
receiving, by the UE, information indicating a periodicity for performing the beam sweep in the first network, the information received from a base station in the second network;
adjusting the periodicity for performing the beam sweep, the beam sweep being a plurality of transmissions of a beam in a plurality of different transmit spatial directions by one of the base station or the UE and a plurality of scans of the beam transmissions in a plurality of different scan spatial directions by an other of said one of the base station or the UE; and
performing, by the UE, the beam sweep in the first network at the adjusted periodicity.

14. The method of claim 13, wherein the second network is at least one of a long term evolution (LTE) network or a network having a carrier frequency that is less than 3 gigahertz (GHz).

15. The method of claim 13, wherein the information indicating the adjusted periodicity is received over the second network as system information.

16. The method of claim 13, wherein the performing the beam sweep comprises transmitting n beams to the base station, each beam being transmitted in one transmit spatial direction of n different transmit spatial directions of the UE.

17. The method of claim 13, wherein the performing the beam sweep comprises scanning for m beams from the base station, each beam being associated with a different transmit spatial direction of m different transmit spatial directions of the base station.

18. The method of claim 17, further comprising:
measuring a channel quality between the base station and the UE based on a previous beam sweep; and
sending information indicating the channel quality to the base station, the information being intended for a management node, the received information indicating the periodicity being based on the sent information indicating the channel quality.

19. An apparatus for wireless communication, the apparatus being a base station, comprising:
means for obtaining timing information from a second network having a lower carrier frequency than a first network, the first network being a millimeter wave (mmW) network;
synchronizing a timing of a beam sweep in the first network based on the timing information obtained from the second network;
means for adjusting a periodicity for performing the beam sweep in the first network, the beam sweep being a plurality of transmissions of a beam in a plurality of different transmit spatial directions by one of the base station or a user equipment (UE) and a plurality of scans of the beam transmissions in a plurality of different scan spatial directions by an other of said one of the base station or the UE;
means for sending, by the base station in the second network, information indicating the adjusted periodicity for performing the beam sweep; and
means for performing, by the base station, the beam sweep in the first network at the adjusted periodicity.

20. The apparatus of claim 19, wherein the second network is at least one of a long term evolution (LTE) network or a network having a carrier frequency that is less than 3 gigahertz (GHz).

21. The apparatus of claim 19, wherein the base station serves a set of UEs and the means for performing the beam sweep is configured to transmit m beams to the set of UEs, each beam being transmitted in one transmit spatial direction of m different transmit spatial directions of the base station.

22. The apparatus of claim 19, wherein the base station serves a UE and the means for performing the beam sweep is configured to scan for n beams from the UE, each beam being associated with a different transmit spatial direction of n different transmit spatial directions of the UE.

23. The apparatus of claim 22, further comprising:
means for measuring a channel quality between the UE and the base station based on a previous beam sweep;
means for sending information indicating the channel quality to a management node; and
means for receiving information indicating the periodicity to which to adjust from the management node, the information indicating the periodicity being based on the measured channel quality, the periodicity being adjusted based on the received information indicating the periodicity.

24. An apparatus for wireless communication, the apparatus being a user equipment (UE), comprising:
means for obtaining timing information from a second network having a lower carrier frequency than a first network, the first network being a millimeter wave (mmW) network;
means for synchronizing a timing of a beam sweep in the first network based on the timing information obtained from the second network;

means for receiving, by the UE, information indicating a periodicity for performing the beam sweep in the first network, the information received from a base station in the second network;

means for adjusting the periodicity for performing the beam sweep, the beam sweep being a plurality of transmissions of a beam in a plurality of different transmit spatial directions by one of the base station or the UE and a plurality of scans of the beam transmissions in a plurality of different scan spatial directions by an other of said one of the base station or the UE; and means for performing, by the UE, the beam sweep in the first network at the adjusted periodicity.

25. The apparatus of claim 24, wherein the second network is at least one of a long term evolution (LTE) network or a network having a carrier frequency that is less than 3 gigahertz (GHz).

26. The apparatus of claim 24, wherein the means for performing the beam sweep is configured to scan for m beams from the base station, each beam being associated with a different transmit spatial direction of m different transmit spatial directions of the base station.

27. The apparatus of claim 26, further comprising:

means for measuring a channel quality between the base station and the UE based on a previous beam sweep; and means for sending information indicating the channel quality to the base station, the information being intended for a management node, the received information indicating the periodicity being based on the sent information indicating the channel quality.

* * * * *